US006576336B1

(12) United States Patent
LeGrande

(10) Patent No.: US 6,576,336 B1
(45) Date of Patent: Jun. 10, 2003

(54) ELECTRICALLY CONDUCTIVE AND ELECTROMAGNETIC RADIATION ABSORPTIVE COATING COMPOSITIONS AND THE LIKE

(75) Inventor: Wayne B. LeGrande, Chesapeake, VA (US)

(73) Assignee: Unitech Corporation, LLC, Hampton, VA (US)

( * ) Notice: Subject to any disclaimer, the term of this patent is extended or adjusted under 35 U.S.C. 154(b) by 0 days.

(21) Appl. No.: 09/151,445

(22) Filed: Sep. 11, 1998

(51) Int. Cl.⁷ .............................. B32B 5/16; C08J 3/02; C08K 3/20; H01B 1/06; C09D 11/00
(52) U.S. Cl. ................... 428/327; 428/323; 428/408; 428/403; 428/406; 524/495; 524/501; 252/511; 252/502; 252/512; 252/518.1; 106/31.25; 138/146
(58) Field of Search ................... 428/546, 564, 428/521, 522, 523, 403, 406, 408, 331, 323–328, 412, 458, 327, 36.91; 106/31.25, 31, 33, 31.41, 31.45, 31.46, 37.58, 156.1; 252/502, 511, 512, 514, 518.1; 524/495, 501, 516, 522, 523, 525, 526, 435

(56) References Cited

U.S. PATENT DOCUMENTS

| 3,649,336 A | * | 3/1972 | Van Paesschen et al. ..... 117/83 |
| 4,254,214 A | * | 3/1981 | Takeda et al. .............. 430/415 |
| 4,452,950 A | * | 6/1984 | Wideman ................... 525/339 |
| 4,624,798 A | * | 11/1986 | Gindrup et al. .......... 252/62.54 |
| 4,624,865 A |   | 11/1986 | Gindrup et al. .......... 427/126.2 |
| 4,687,789 A | * | 8/1987 | Gonnet et al. .............. 523/122 |
| 4,818,438 A |   | 4/1989 | Wiley ........................ 252/511 |
| 4,826,631 A |   | 5/1989 | Sullivan .................... 252/512 |
| 4,889,750 A |   | 12/1989 | Wiley ........................ 428/34.2 |
| 5,002,826 A |   | 3/1991 | Pollart et al. ............... 428/323 |
| 5,156,709 A | * | 10/1992 | Mammino et al. .......... 156/235 |
| 5,286,415 A | * | 2/1994 | Buckley et al. ............. 252/502 |
| 5,492,653 A | * | 2/1996 | Hochheimer et al. ....... 252/514 |
| 5,585,427 A |   | 12/1996 | Schimmel et al. .......... 524/377 |
| 5,658,499 A | * | 8/1997 | Steinberg et al. ........... 252/514 |
| 5,741,828 A | * | 4/1998 | Stoy et al. .................. 524/501 |
| 5,744,544 A |   | 4/1998 | Dunaway et al. ........... 524/832 |
| 5,756,008 A |   | 5/1998 | Slutsky et al. .............. 252/514 |
| 5,786,785 A |   | 7/1998 | Gindrup et al. ................ 342/1 |
| 5,830,305 A | * | 11/1998 | Anderson et al. ........... 156/242 |
| 5,852,975 A | * | 12/1998 | Miyabe et al. ........... 101/463.1 |
| 5,891,598 A | * | 4/1999 | Miyabe et al. ................ 430/49 |

OTHER PUBLICATIONS

Spectro Dynamic Systems information sheets.

* cited by examiner

Primary Examiner—Harold Pyon
Assistant Examiner—Michael C. Miggins
(74) Attorney, Agent, or Firm—Jacobson Holman PLLC

(57) ABSTRACT

A coating composition having a water soluble emulsion polymer binder. The binder is a blend of a first emulsion containing a conjugated diene as monomer or comonomer, and a second emulsion containing an acrylic polymer. An effective amount of electrically conductive particles is dispersed in the binder. The particles include a combination of graphite particles, metal containing particles. A solvent effective amount of water is also present.

32 Claims, No Drawings

ELECTRICALLY CONDUCTIVE AND ELECTROMAGNETIC RADIATION ABSORPTIVE COATING COMPOSITIONS AND THE LIKE

BACKGROUND OF THE INVENTION

1. Field of the Invention

The present invention is directed to electrically conductive and electromagnetic radiation absorptive coating compositions and the like.

2. Brief Description of the Prior Art

A variety of coating compositions are known which have electrically conductive or electromagnetic radiation absorptive properties or the like. The solvent for many of the coating compositions has been primarily a volatile organic compound (VOC). A VOC-based binder system has several drawbacks. It may be toxic, flammable, and possibly explosive. The VOC raw material is costly to purchase and the waste is expensive to discard. Generally, VOC solvent emitted from coating operations is an environmental air pollutant. Expensive equipment and procedures are required to capture and contain VOC solvent emissions in order to reduce air pollution and enable proper waste disposal.

Coating compositions are also known which use electrically conductive or electromagnetic radiation absorptive microspheres. However, these coating compositions have been limited by the binder systems employed.

Finally, coating compositions are known which use a plurality of electrically conductive particles. However, these coating compositions have also been limited by the binder systems employed.

Accordingly, it is an object of the present invention to provide an aqueous based coating composition having electrically conductive or electromagnetic radiation absorptive properties or the like.

It is a further object of the present invention to provide a coating composition which is electrically conductive or electromagnetic absorptive or the like having an improved binder system.

These and other objects of the invention will become more apparent upon reading the following description of the invention.

SUMMARY OF THE INVENTION

The present invention is directed to an electrically conductive or electromagnetic radiation absorptive coating composition or the like having a water soluble emulsion polymer binder. The binder is a blend of a first emulsion containing a conjugated diene monomer or comonomer, and a second emulsion containing an acrylic polymer. The first emulsion preferably includes an ethylenically unsaturated comonomer which is typically an unsaturated nitrile such as acrylonitrile, a monovinyl aromatic hydrocarbon such as styrene, or vinylpyridine. The first emulsion is preferably a substantially saturated carboxylated or non-carboxylated butadiene-acrylonitrile latex. The carboxylated butadiene-acrylonitrile latex preferably contains unreacted salts.

The coating composition also contains an effective amount of electrically conductive particles dispersed in the binder. The particles include a combination of graphite particles, and metal containing particles. The graphite particles are preferably natural flake graphite. The metal containing particles are preferably silver or nickel containing particles. The silver or nickel containing particles are more preferably silver or nickel coated ceramic microspheres which may have electromagnetic radiation absorptive properties.

The coating composition also contains water. The water is present in a solvent effective amount.

The present invention further relates to a coated substrate. The substrate is typically paper, cloth, plastics such as polycarbonate, acrylic, nylon and polyester, rubber, steel or fiberglass. The substrate may be a plastic component of an electronic device. The substrate may also be a pipe, a rubber mat, or the like. In the case where the metal containing particles are electromagnetic radiation absorptive microspheres, the substrate is typically a vehicle such as an aircraft.

DESCRIPTION OF THE PREFERRED EMBODIMENTS

The first emulsion of the coating composition includes polymers composed of 5 to 100% by weight of a conjugated diene monomer unit and 95 to 0% by weight of an ethylenically unsaturated monomer unit. Specific examples of the conjugated diene monomer are 1,3-butadiene, 2,3-dimethylbutadiene, isoprene and 1,3-pentadiene. Specific examples of the ethylenically unsaturated monomer include unsaturated nitriles such as acrylonitrile and methacrylonitrile, monovinyl aromatic hydrocarbons such as styrene and alkylstyrenes, divinyl aromatic hydrocarbons such as divinylbenzene, dialkenyl aromatics such as diisopropenylbenzene, unsaturated carboxylic acids and the esters thereof such as acrylic acid, methacrylic acid, crotonic acid, itaconic acid, maleic acid, methyl acrylate, ethyl acrylate, butyl acrylate, 2-ethylhexyl acrylate and methyl methacrylate; vinylpyridine; and vinyl esters such as vinyl acetate. The polymer may be one hydrogenated by the method described in U.S. Pat. No. 4,452,950, the disclosure of which is expressly incorporated herein by reference.

Specific examples of polymers include nitrile butadiene, styrene butadiene, butadiene reacted with vinyl pyridine, polybutadiene, carboxylated nitrile butadiene and carboxylated styrene butadiene. A preferred polymer is a highly saturated butadiene/acrylonitrile copolymer latex available from the Goodyear Tire and Rubber Company, Akron, Ohio ("Goodyear") as Chemisat LCH-7302X latex. Another preferred polymer is a highly saturated carboxylated butadiene/acrylonitrile latex available from Goodyear as Chemisat LCH-7505X latex. The carboxylated commercial product contains unreacted salts which are believed to be particularly beneficial to the invention.

The second emulsion is an acrylic latex. Suitable acrylic emulsions are available from Rohm and Haas Company, Philadelphia, Pa. ("Rohm and Haas") as Rhoplex® WL-96 waterborne acrylic polymer and Maincote® HG-54D waterborne acrylic resin.

The blending of the second or acrylic emulsion with the first emulsion results in several desirable properties and improvements in the characteristics of the first emulsion. The acrylic emulsion enhances the chemical resistance of the first emulsion, improves its hardness while retaining its flexibility, enhances its adhesion properties to create a stronger bond with a substrate, and makes the resulting blend smoother. The use of the acrylic emulsion may also improve the exterior durability of the first emulsion as well as its abrasion resistance.

The graphite particles are preferably natural flake graphite. Suitable natural flake graphite particles are available from the Ashbury Graphite Mills, Inc., Ashbury, N.J., having a particle size of about 97% or greater passing 325 mesh U.S. Standard Sieve (−44 microns). These particles contain about 95% or greater carbon. The particles are available under the grade numbers 146, Micron 750 and Micron 790.

The metal containing particles are preferably silver or nickel containing particles; however, other metals may also be employed such as gold, platinum and palladium. The metal containing particles are more preferably metal coated ceramic microspheres.

As disclosed in U.S. Pat. Nos. 4,624,798 and 4,624,865, the disclosures of which are expressly incorporated herein by reference, electrically nonconductive magnetic microballoons or microspheres may be coated with an extremely thin layer of metal to produce a material which can be incorporated into electrically nonconductive materials to give composites with superior electrical conductivity. These composites have a very low density, often lower than the electrically nonconductive plastic. Additionally, the desirable mechanical properties of the composite are only slightly affected by the inclusion of metal coated magnetic microballoons.

As further disclosed in the '798 and '865 patents, certain grades of commercially available ceramic microballoons have inherent magnetic properties. The magnetic properties are attributable to the presence in the ceramic composition of magnetic components such as iron, nickel, iron oxide, ferrite or mixtures of these materials. This magnetic property enhances the tendency of the metal coated microballoons to form networks, and gives composites with exceptional electrical conductivity.

The '798 and '865 patents disclose the use of commercially available ceramic microballoons which are lightweight, strong microspheres formed of a ceramic composition composed primarily of aluminum silicates, magnesium silicates, sodium silicates, or mixtures of these materials. The microspheres have a hollow, porous ceramic shell, and are considerably stronger and more abrasion resistant than siliceous (glass) hollow microspheres. More particularly, these ceramic microspheres, which are referred to as "centospheres" are derived from the ash from industrial furnaces which burn powdered coal, and certain grades of them are magnetic as a consequence of the coal containing magnetic impurities such as iron, ferrite, nickel, ferric oxide and magnetite. Since they are a byproduct of coal-fired furnaces, they are considerably less expensive than commercially manufactured microballoons.

According to the '798 and '865 patents, noble metals such as silver, gold, platinum, and palladium give the best results, having a negligible tendency to oxidize at the contact points. By providing a thin coating of the noble metal on the surface of an inexpensive and lightweight magnetic microballoon, it is said to be possible to achieve the desirable electrical properties of the metal. The microballoons are preferably coated with silver.

According to U.S. Pat. No. 5,786,785, the disclosure of which is expressly incorporated herein by reference, metal coated microspheres of the type described in U.S. Pat. Nos. 4,624,798 and 4,624,865 can be used to form strong, very lightweight coatings and composites which absorb electromagnetic radiation. The microspheres having a diameter of from 1 to 350 microns, the microballoons containing at least one radiation absorbing material selected from the group consisting of carbon, ferrites, magnetite, iron, nickel and cobalt; and having a thin coating of metal on the microsphere surface, the metal coating being present in a percentage by weight of 0.01 to 22 percent. Preferably, the '785 patent states the microspheres comprise ceramic magnetic microspheres derived from the ash from coal fired furnaces, and these microspheres possess permanent magnetic properties.

According to the '785 patent, the microspheres are coated with a thin coating of an electrically conductive metal. While any conductive metal may be used, silver, gold, platinum, palladium and their alloys are preferred. The microspheres are plated with the metal using the procedures described in U.S. Pat. Nos. 4,624,798 and 4,624,865.

For best results, the '785 patent states the coating should be electrically isolated from an electrically conductive substrate by a coating of insulator material applied as a primer. The thickness of the primer and its electrical properties become less important as the thickness of the absorptive layer increases. The absorptive layer may be top coated to give a very tough and smooth final surface with any conventional coating which is radar transparent.

Microspheres of the type described above are commercially available from Spectro Dynamic Systems, Hickory, N.C. ("Spectro Dynamic"). These microspheres include silver coated cenospheres having particle sizes of 5 to 75 microns in diameter and typical silver thickness of 500 angstroms.

The combination of graphite particles with metal containing particles avoids certain detrimental characteristics found in the prior art. In materials utilizing graphite as a conductive component, the amount of graphite required to produce adequate conductivity may result in an undesirable decrease in film-forming properties. Also, metal particles are very dense compared to the typical polymer used as a binder and tend to settle out and separate from the binder. By using a combination of graphite and metal containing particles, a sufficient amount of binder may be used to provide the desirable film-forming properties (e.g., adhesion, film integrity, flexibility, durability) while obtaining improved conductivity. In particular, when graphite particles are used in combination with metal coated microspheres, it is believed that the graphite particles fill in the gaps between the microspheres to provide improved electrical conductivity properties.

The polymer blend also includes water. The water is present in a solvent effective amount.

The coating composition will typically contain about 10–600 parts by weight of the first emulsion, preferably about 300–500 parts by weight. The coating composition will typically contain about 10–600 parts by weight of the second emulsion, preferably about 100–300 parts by weight. The coating composition will typically contain about 1–280 parts by weight of the graphite particles, preferably about 20–200 parts by weight. The coating composition will typically contain about 1–280 parts by weight of the metal containing particles, preferably about 20–200 parts by weight. The coating composition will also typically contain, in addition to any water which is present in the binder system, about 50–150 parts by weight of water, preferably about 75–125 parts by weight. The coating composition may also include various additives such as tetrafluoroethylene fluorocarbon polymers, thickening agents, dispersants, and anti-foaming agents, in amounts conventionally employed in these types of compositions.

The binder system described herein which includes a blend of the first and second emulsions may be used as a primer or top coat for the coating composition of the present invention. Alternatively, conventional primers and top coats may be employed in combination with the coating composition of the present invention depending upon the desired use of the product. For example, an acrylic latex may be used as a top coat for the coating composition of the present invention.

Typical specifications of the coating composition of the present invention are:

| | |
|---|---|
| Wgt. per gal: | 8.1–8.5 |
| % Wgt. solids: | 48.0–50.0 |
| Viscosity: | 18–22 #2Z |
| % Saturation: | 94 ± 2 |
| % Solids: | 32.0–34.0 |
| Surface Tension d/cm | 36 |
| pH: | 9.8–10.2 |

The present invention provides an excellent coating for paper among other substrates. It offers excellent resistance to heat, solvent, gasoline, aging, ozone, ultraviolet light oxygen and fluid while being aqueous based. It requires no hydrogen, solvents, expensive catalysts or special equipment. Its heat aging is superior to conventional nitrile butadiene rubber and can be formulated in dip systems or beater additions. It also has good low temperature flexibility and excellent flex fatigue resistance. This product has a low VOC and is non-flammable. It has an excellent dry time of about 20 minutes tack free and can be force-dried.

The coating composition of the present invention can be coated on a variety of substrates. The substrates include paper, cloth, plastics such as polycarbonate, acrylic, nylon and polyester, rubber, steel and fibers such as arasid and glass.

The application of the coatings to substrates is simple and straightforward. The substrates can be brushed, sprayed, rolled or roll coated. In addition, the substrates can be coated by dip application. In dip applications, several dipping operations will be required to achieve the necessary film thickness (e.g., 2–10 mils). After each dip application, forced air drying should be used.

The invention also can be used for the coating of paper by beater addition to strengthen and fortify the paper fiber to make it chemically resistant. This method can produce coatings to protect gaskets and paper from the effects of transmission fluids, gasolines, oil, and heat to temperatures of 350° F. A beater is a special machine used to open and disperse by mechanical action the fiber bundles in a dilute slurry of pulp. The dispersed fibers are then shortened and fibrillated by continuing the action of the beater before adding the coating material of the present invention. Once added to the beater or to a downstream mixing tank, the coating material is precipitated under controlled conditions by reaction with alum or cationic agents such as water soluble polyamides or polyamines. Dilute aqueous aluminum sulfate solutions are used to completely precipitate the coating material from the highly diluted slurry onto the fiber and fillers. Once the latex precipitation is complete, the stock or "furnish", as it may be called, is fed to a machine chest and into the paper machine. Once this process is completed, the paper fibers are further coated with the coating of the present invention.

The coatings of the present invention have tremendous adhesion properties and performance to a variety of substrates. The coatings have unique conductive and shielding properties. For example, a paper circuit board coated with this water-based system can effectively conduct electricity and shield electronic devices from stray electrical currents. The coatings can also be used as water-based decontaminable coatings for military applications. The coatings also have high military value in stealth technology for hiding ships, planes, etc.

The chemistry of the present invention is based on a combination of acrylic waterborne resins in combination with water-based conjugated diene monomer or comonomer rubber resins which has created a unique combination of chemical resistance and adhesion properties. The incorporation of conductive particles has enhanced the electrical properties. Also, one of the resins has about 6% unreacted conductive salts that adds to its conductive properties.

Illustrative end uses include the following:

1) electrical conductive and shielded paper;
2) chemical warfare resistant coatings for paper, plastic, cloth, steel, fiberglass, etc.;
3) plastics components for computers, electronic devices shielded from stray radio waves and electrical impulses;
4) coated plastic pipe, rubber, and plastic to dissipate electrical charges built up during transferring of flammable liquids or in explosive environments;
5) electrical and shielded rubber water-based coatings;
6) water-based shielded electrical coating systems with chemically decontaminable water-based systems for bacteriological warfare;
7) use of the above coating systems to provide stealth characteristics for military applications for tanks, planes, jeeps, ships, etc.;
8) use of the above coating systems on radar domes, antennae, computers, etc. for shielding and static electrical dissipation; and
9) application to rubber mats for grounding of electrical devices and computers.

A preliminary evaluation has been made of a coating of the present invention as a flex-circuit impedance matching coating. The impedance versus frequency of the coated tape varied between about 25 and 40. All of the data was for both sides coated, one central signal run between two shield runs, but neither coating shorted to the shields. The ideal transmission line will have a broad band of constant impedance (generally at 50 or 75 ohms) versus frequency. Against this criterion, the coating of the present invention was comparable to other impedance matching coatings. Some of the impedance variation may have been due to the inconsistent thickness of the coating on the test sample. The coating varied from 0.0045" to 0.0145" thick with an average thickness of 0.0063". Improved application methods, such as spray or screen printing, will enable improved thickness control. The coating represents a much higher resistance coating than other coatings previously evaluated. The volume resistivity is approximately 2800 milliohm-cm, compared to 1.2 milliohm-cm of another coating and 0.2 milliohm-cm of yet another coating. Since the impedance reduction is comparable for these coatings of vastly different conductivity, it appears that the impedance depression effect is not highly sensitive to coating resistance, at least in the range of several hundred ohms per inch.

While certain representative embodiments and details have been shown for the purpose of illustrating the invention, it will be apparent to those skilled in this art that various changes and modifications may be made therein without departing from the scope of the invention.

I claim:

1. A coating composition having electrically conductive and electromagnetic radiation absorptive properties, comprising:

(1) a water emulsion polymer binder, the binder being a blend of
  (a) a first emulsion containing a water-insoluble polymer prepared from 5 to 100 percent by weight of a conjugated diene monomer or comonomer and 95 to 0 percent by weight of an ethylenically unsaturated comonomer, and
  (b) a second emulsion containing an acrylic polymer;
(2) electrically conductive particles dispersed in the binder, the particles including a combination of
  (a) graphite particles, and
  (b) metal containing particles; and
(3) water.

2. The composition of claim 1, wherein the conjugated diene is butadiene comonomer and the first emulsion includes the ethylenically unsaturated comonomer.

3. The composition of claim 2, wherein the ethylenically unsaturated comonomer is an unsaturated nitrile, a monovinyl aromatic hydrocarbon or vinylpyridine.

4. The composition of claim 3, wherein the ethylenically unsaturated comonomer is acrylonitrile, styrene or vinylpyridine.

5. The composition of claim 1, wherein the first emulsion is a substantially saturated carboxylated or non-carboxylated butadiene-acrylonitrile latex.

6. The composition of claim 5, wherein the carboxylated butadiene-acrylonitrile latex contains unreacted salts.

7. The composition of claim 1, wherein the graphite particles are natural flake graphite.

8. The composition of claim 1, wherein the metal particles are silver or nickel containing particles.

9. The composition of claim 8, wherein the silver or nickel containing particles are silver or nickel coated ceramic microspheres.

10. The composition of claim 9, wherein the microspheres are electromagnetic radiation absorptive microspheres.

11. A coated substrate, comprising a substrate and the coating composition of claim 1 coated thereon.

12. The coated substrate of claim 11, wherein the substrate is paper, cloth, plastic, rubber, steel or fiberglass.

13. The coated substrate of claim 12, wherein the plastic is a polycarbonate, acrylic or nylon plastic.

14. The coated substrate of claim 11, wherein the substrate is a plastic component of an electronic device.

15. The coated substrate of claim 11, wherein the substrate is a pipe.

16. The coated substrate of claim 11, wherein the substrate is a rubber mat.

17. The coated substrate of claim 11, wherein the metal containing particles are electromagnetic radiation absorptive microspheres.

18. The coated substrate of claim 17, wherein the substrate is a vehicle.

19. The coated substrate of claim 17, wherein the substrate is paper and the substrate is coated by adding the coating composition by beater addition or coating the paper with the coating composition after the paper leaves the paper machine.

20. An electrically conductive and electromagnetic radiation absorptive coating composition of claim 1 wherein the first emulsion comprises from about 10 to about 600 parts by weight, the second emulsion comprises from about 10 to about 600 parts by weight, the graphite particles comprise from about 1 to about 280 parts by weight, the metal-containing particles comprise from about 1 to about 280 parts by weight, and the amount of water, in addition to that in said binder, comprises from about 50 to about 150 parts by weight.

21. A coating composition of claim 20 wherein the first emulsion comprises from about 300 to about 500 parts by weight, the second emulsion comprises from about 100 to about 300 parts by weight, the graphite particles comprise from about 20 to about 200 parts by weight, the metal-containing particles comprise from about 20 to about 200 parts by weight, and the amount of water, in addition to that in said binder, comprises from about 75 to about 125 parts by weight.

22. A coating composition having electrically conductive and electromagnetic radiation absorptive properties, comprising:
(1) a water emulsion polymer binder, the binder being a blend of
  (a) a first emulsion containing a water-insoluble polymer of butadiene and ethylenically unsaturated comonomers, and
  (b) a second emulsion containing an acrylic polymer;
(2) electrically conductive particles dispersed in the binder, the particles including a combination of
  (a) graphite particles, and
  (b) metal containing particles, the metal containing particles being metal coated ceramic microspheres; and
(3) water.

23. The composition of claim 22, wherein the ethylenically unsaturated comonomer is acrylonitrile, styrene or vinylpyridine.

24. The composition of claim 22, wherein the first emulsion is a substantially saturated carboxylated or non-carboxylated butadiene-acrylonitrile latex.

25. The composition of claim 22, wherein the metal particles are silver or nickel containing particles.

26. The composition of claim 22, wherein the microspheres are electromagnetic radiation absorptive microspheres.

27. A coated substrate, comprising a substrate and the coating composition of claim 22 coated thereon.

28. The coated substrate of claim 27, wherein the substrate is a plastic component of an electronic device.

29. The coated substrate of claim 27, wherein the metal containing particles are electromagnetic radiation absorptive microspheres.

30. The coated substrate of claim 29, wherein the substrate is a vehicle.

31. A coating composition having electrically conductive and electromagnetic radiation absorptive properties, comprising:
(1) a water emulsion polymer binder, the binder being a blend of
  (a) a first emulsion which is a substantially saturated carboxylated or non-carboxylated butadiene-acrylonitrile latex, and
  (b) a second emulsion containing an acrylic polymer;
(2) electrically conductive particles dispersed in the binder, the particles including a combination of
  (a) natural flake graphite particles, and
  (b) silver coated ceramic microspheres; and
(3) water.

32. A coated substrate, comprising a substrate and the coating composition of claim 31 coated thereon.

\* \* \* \* \*